(12) United States Patent (10) Patent No.: US 7,743,772 B2
Sundar et al. (45) Date of Patent: Jun. 29, 2010

(54) SILVER AND SILVER OXIDE CATALYSTS FOR THE OXIDATION OF CARBON MONOXIDE IN CIGARETTE SMOKE

(75) Inventors: Rangaraj S. Sundar, Midlothian, VA (US); Sarojini Deevi, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 870 days.

(21) Appl. No.: 10/868,015

(22) Filed: Jun. 16, 2004

(65) Prior Publication Data

US 2005/0279372 A1 Dec. 22, 2005

(51) Int. Cl.
*A24B 15/18* (2006.01)
*B01J 23/48* (2006.01)
*B01J 23/10* (2006.01)
(52) U.S. Cl. .................. 131/334; 502/347; 502/304
(58) Field of Classification Search .................. None
See application file for complete search history.

(56) References Cited

U.S. PATENT DOCUMENTS

| | | | |
|---|---|---|---|
| 3,338,246 A | 8/1967 | Mays | |
| 4,463,030 A | 7/1984 | Deffeyes et al. | |
| 4,639,432 A | 1/1987 | Holt et al. | |
| 4,673,556 A | 6/1987 | McCabe et al. | |
| 4,956,330 A | 9/1990 | Elliott et al. | |
| 4,996,180 A * | 2/1991 | Diwell et al. | 502/304 |
| 5,258,340 A | 11/1993 | Augustine et al. | |
| 5,322,075 A | 6/1994 | Deevi et al. | |
| 5,446,003 A | 8/1995 | Augustine et al. | |
| 5,462,903 A | 10/1995 | Rousset et al. | |
| 5,591,368 A | 1/1997 | Fleischauer et al. | |
| 5,934,289 A | 8/1999 | Watkins et al. | |
| 6,053,176 A | 4/2000 | Adams et al. | |
| 6,074,979 A | 6/2000 | Hagemeyer et al. | |
| 6,083,467 A | 7/2000 | Takeshima et al. | |
| 6,228,904 B1 | 5/2001 | Yadav et al. | |
| 6,235,677 B1 | 5/2001 | Manzer et al. | |

(Continued)

FOREIGN PATENT DOCUMENTS

WO WO02/43514 A1 6/2002

OTHER PUBLICATIONS

Kundakovic, Lj., Fltzani-Stephanopoulos, M., "Cu- and Ag-Modified Cerium Oxide Catalysts for Methane Oxidation", Journal of Catalysis, (1998), 179, 203-221.*

(Continued)

*Primary Examiner*—Philip C Tucker
*Assistant Examiner*—Michael J Felton
(74) *Attorney, Agent, or Firm*—Buchanan Ingersoll & Rooney PC

(57) ABSTRACT

A component of a cigarette comprises a silver-based catalyst for the conversion of carbon monoxide to carbon dioxide. The silver-based catalyst comprises particles (e.g., nanoscale or larger sized particles) of metallic silver and/or silver oxide supported in and/or on metal oxide support particles. The silver-based catalyst can be incorporated into a cigarette component such as tobacco cut filler, cigarette paper and cigarette filter material to reduce the concentration of carbon monoxide in the mainstream smoke of a cigarette during smoking. The catalyst can also be used in non-cigarette applications.

48 Claims, 9 Drawing Sheets

U.S. PATENT DOCUMENTS

| | | |
|---|---|---|
| 6,262,129 B1 | 7/2001 | Murray et al. |
| 6,265,341 B1 | 7/2001 | Komatsu et al. |
| 6,286,516 B1 | 9/2001 | Bowen et al. |
| 6,299,778 B1 | 10/2001 | Penth et al. |
| 6,342,191 B1 | 1/2002 | Kepner et al. |
| 6,348,431 B1 | 2/2002 | Even, Jr. |
| 6,789,548 B2 * | 9/2004 | Bereman ............... 131/352 |
| 2002/0062834 A1 * | 5/2002 | Snaidr et al. ............ 131/365 |
| 2003/0000538 A1 | 1/2003 | Bereman |
| 2003/0005940 A1 | 1/2003 | Dyakonov et al. |
| 2003/0037791 A1 | 2/2003 | An |
| 2003/0075193 A1 | 4/2003 | Li et al. |
| 2004/0007242 A1 | 1/2004 | Finlay et al. |

OTHER PUBLICATIONS

International Preliminary Report on Patentability dated Dec. 20, 2006 for PCT/IB2005/002473.

Partial International Search Report dated Nov. 22, 2005 for PCT/IB2005/003473.

Katz, "Condensation of a Supersaturated Vapor. I. The Homogeneous Nucleation of the $n$-Alkanes" The Journal of Chemical Physics, vol. 52, No. 9, May 1, 1970, pp. 4733-4748, American Institute of Physics, Lancaster, PA and New York, NY.

Seiichiro Imamura et al., "Combustion activity of $Ag/CeO_2$ composite catalyst", Applied Catalysis A: General, 192 (2000) 221-226, Elsevier Science B.V.

Meng-Fei Luo et al., "Catalyst characterization and activity of Ag-Mn, Ag-Co and Ag-Ce composite oxides for oxidation of volatile organic compounds", Applied Catalysis A: General, 175 (1998) 121-129, Elsevier Science B.V.

International Search Report and Written Opinion dated Mar. 10, 2006 for PCT/IB2005/002473.

* cited by examiner

SILVER AND SILVER OXIDE CATALYSTS FOR THE OXIDATION OF CARBON MONOXIDE IN CIGARETTE SMOKE

Smoking articles such as cigarettes or cigars produce both mainstream smoke during a puff and sidestream smoke during static burning. One constituent of both mainstream smoke and sidestream smoke is carbon monoxide (CO). The reduction of carbon monoxide in smoke is desirable.

SUMMARY

Provided are cut filler compositions, cigarette paper, cigarette filter material, cigarettes, and methods for making cigarettes that use silver-based catalysts. The silver-based catalysts, which are preferably capable of acting as both an oxidant and as a catalyst for the conversion of carbon monoxide to carbon dioxide, can reduce the amount of carbon monoxide and/or total particulate matter in the mainstream smoke of a cigarette during smoking.

The silver-based catalyst comprise particles of silver and/or silver oxide that are supported in and/or on support particles of an oxide of a second metal. Preferably the particles of silver and/or silver oxide are nanoscale particles. For example, in a preferred embodiment, nanoscale particles of silver are supported on an exposed surface of particles of an oxide of a second metal. The support particles can comprise nanoscale and/or micron-sized particles. Preferably, the oxide of the second metal is a non-stoichiometric oxide. Exemplary second metals include magnesium, aluminum, silicon, titanium, vanadium, chromium, manganese, iron, yttrium, zirconium, niobium, cerium, hafnium and mixtures thereof. Catalysts that comprise oxide-supported silver and/or silver oxide particles preferably comprise, by weight, from about 1 to 70%, more preferably from about 5 to 20% silver and/or silver oxide. According to an embodiment, the silver and/or silver oxide particles have an average particle size of less than about 100 nm, more preferably less than about 50 nm. The catalyst can comprise agglomerates of nanoscale silver and/or silver oxide particles, wherein the agglomerates have an average size of from about 1 to 50 microns.

A method of making a cigarette comprising a silver-based catalyst comprises the steps of (i) incorporating the silver-based catalyst in at least one of tobacco cut filler, cigarette paper and cigarette filter material; (ii) providing the tobacco cut filler to a cigarette making machine to form a tobacco column; (iii) placing the cigarette paper around the tobacco column to form a tobacco rod of a cigarette; and (iv) optionally attaching a cigarette filter comprising the cigarette filter material to the tobacco rod using tipping paper. The catalyst can be incorporated into one or more components of the cigarette by spraying, dusting or immersion.

According to a preferred method, a catalyst consisting essentially of supported particles of silver and/or silver oxide is incorporated into the component of a cigarette. According to a further method, the catalyst that is incorporated into the component of a cigarette comprises particles of silver and/or silver oxide that are admixed with particles of the oxide support.

Supported silver particles and/or particles comprising silver (e.g., silver oxide) can be made via the precipitation or thermal decomposition of a silver salt such as silver nitrate. According to a further method, the silver-based catalyst can be formed by mixing a solution of a silver salt with a colloidal suspension of an oxide of a second metal and then heating the mixture to decompose the silver salt to form particles of silver and/or silver oxide that are incorporated in and/or on the oxide of the second metal. A preferred second metal is cerium, which can form non-stoichiometric oxide support particles.

According to a further method, silver-based catalysts can be formed by laser vaporization and controlled condensation of a target material under a controlled atmosphere wherein the target material comprises silver and a second metal other than silver. By ablating a suitable target with energy from a laser, nanoscale particles of silver and/or silver oxide and particles of an oxide of a second metal can form and condense in the gas phase to form a silver-based catalyst.

In a preferred embodiment, prior to incorporating the silver-based catalyst in and/or on the at least one of tobacco cut filler, cigarette paper and cigarette filter material, the catalyst is heated at a temperature of at least 200° C. in an atmosphere comprising an oxygen-containing gas so as to oxidize the silver to form a silver-based catalyst consisting essentially of silver oxide supported in and/or on the oxide of the second metal.

The silver-based catalyst can also be used to reduce the concentration of carbon monoxide from a vehicle exhaust emission, a gas used in a laser, a gas used in a fuel cell and/or ambient air undergoing air filtration.

BRIEF DESCRIPTION OF THE DRAWING FIGURES

DETAILED DESCRIPTION OF PREFERRED EMBODIMENTS

Figure 1:
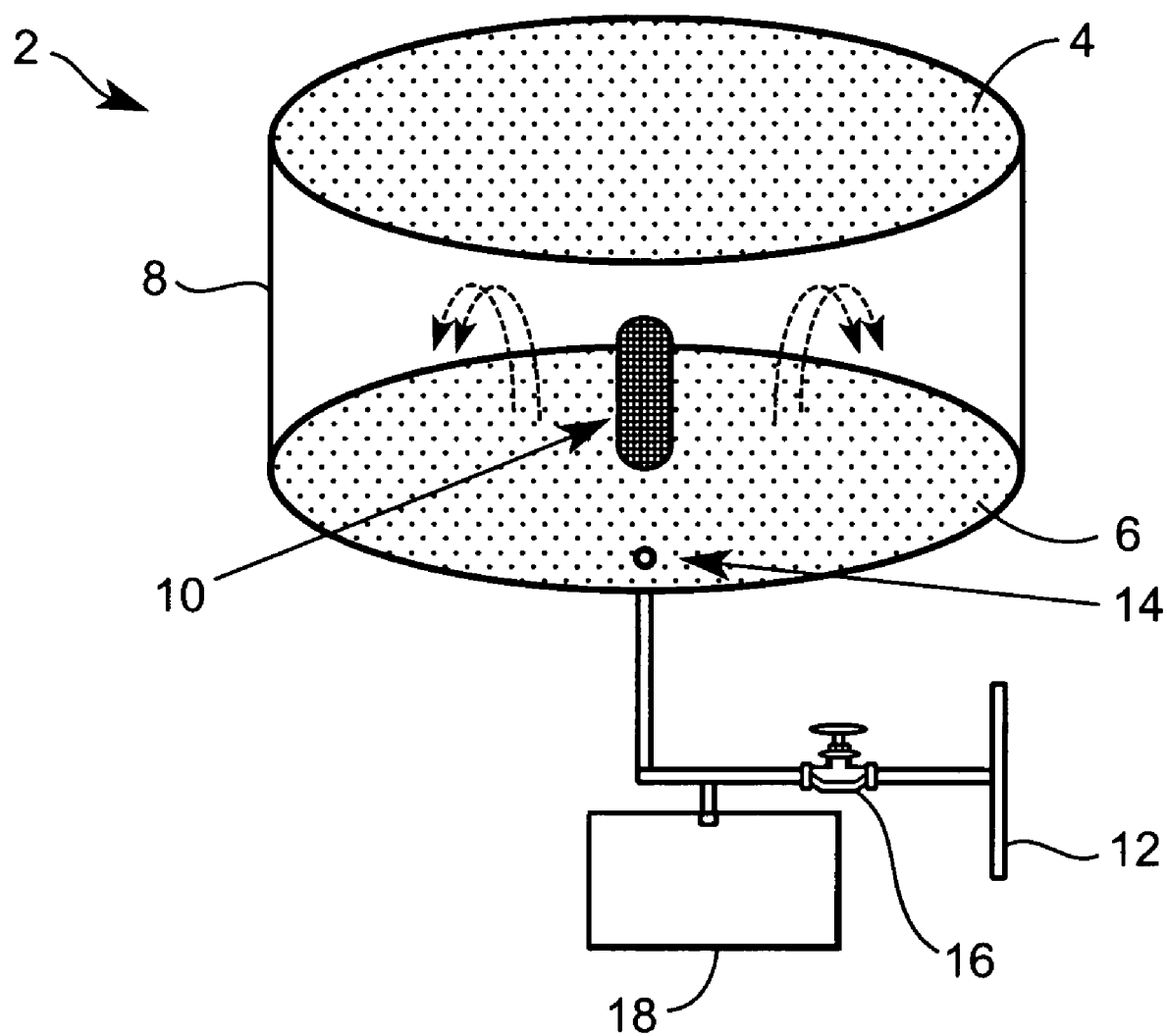
FIG. 1 illustrates a schematic of an apparatus for the synthesis of silver-based catalysts via laser vaporization/controlled condensation.

Silver-based catalysts can be incorporated into a component of a cigarette such as tobacco cut filler, cigarette paper and/or cigarette filter material. The silver-based catalysts can catalyze and/or oxidize the conversion of carbon monoxide to carbon dioxide. In particular, the silver-based catalysts are useful for low-temperature or near-ambient oxidation of carbon monoxide. By incorporating the silver-based catalysts into a component of a cigarette, the amount of carbon monoxide in mainstream smoke can be reduced. The silver-based catalysts comprise particles of silver and/or silver oxide supported on support particles of an oxide of a second metal, the second metal being different than silver.

According to one embodiment, silver-based catalysts can be prepared by precipitating silver and/or silver oxide from an aqueous solution of a silver salt. The precipitated product may be combined with a support such as particles of an oxide of a second metal (i.e., a metal other than silver). Exemplary oxide supports include cerium oxide, titanium oxide and/or aluminum oxide. The precipitated product can be admixed with support particles to form a silver-based catalyst comprising particles of silver and/or silver oxide supported on the support particles.

According to a further embodiment, supported silver based-catalysts can be prepared by mixing a solution of a silver salt with a colloidal suspension of an oxide of a second metal and then thermally decomposing the silver salt under a controlled atmosphere to form a silver-based catalyst comprising silver and/or silver oxide that is incorporated in and/or on the particles of the oxide of the second metal.

According to a further embodiment, nanoscale particles comprising silver (e.g., silver or silver oxide) can be prepared by laser vaporization/controlled condensation from a target comprising silver. With laser vaporization/controlled condensation, a starting material (e.g., target) is exposed to laser energy so as to form a vapor and subsequently condensed to form the silver-based catalyst. Furthermore, using laser vaporization/controlled condensation it is possible to form a silver-based catalyst directly from a target that comprises the constituent atoms of both the silver-based particles and the oxide support particles. A silver-based catalyst comprises particles of silver and/or silver oxide that are incorporated in and/or on particles of an oxide support.

By incorporated in is meant that silver and/or silver oxide comprises a second phase that is in and/or on the oxide matrix of the oxide of the second metal (i.e., a homogeneous or non-homogeneous composite). For example, the silver and/or silver oxide can be dispersed throughout the matrix of the oxide of the second metal and/or dispersed on an exposed surface of the oxide.

According to a preferred embodiment, particles comprising silver and particles comprising an oxide of the second metal are formed simultaneously and co-deposited to form the silver-based catalyst. The silver-based catalyst can be deposited directly on a component of a cigarette or, more preferably, the silver-based catalyst can be formed, collected, and subsequently incorporated in a component of a cigarette.

A preferred method of forming supported silver-based catalysts is laser vaporization/controlled condensation (LVCC). LVCC is an ablative process that uses one or more targets that have material to be incorporated in the catalyst. In an ablative process, a region of the target absorbs incident energy from the energy (e.g., laser) source. The incident energy can comprise, for example, pulsed laser energy. The absorption of energy and subsequent heating of the target causes the target material to ablate from the surface of the target into a plume of atomic and ionic species (i.e., vapor). The atomic and ionic species can condense into particles by vapor phase collisions with each other and with an inert or reactive gas. The particles that form can comprise nanoscale particles.

The amount of energy required will vary depending on process variables such as the temperature of the starting material, the pressure of the atmosphere surrounding the starting material, and material properties such as the thermal and optical properties of the starting material. With laser ablation, the starting material is progressively removed from the target by physical erosion. The target is formed of (or coated with) a consumable material to be removed, i.e., target material.

The starting material may be any suitable precursor material with a preferred form being solid or powder materials composed of pure materials or a mixture of materials. Such materials are preferably solids at room temperature and/or not susceptible to chemical degradation such as oxidation in air. Preferably, the starting material comprises a pressed powder target.

The laser energy preferably vaporizes the starting material directly, without the material undergoing significant liquid phase transformation. The types of lasers that can be used to generate the laser energy can include ion lasers, UV excimer lasers, Nd—YAG and He—Ne lasers. The laser beam can be scanned across the surface of the target material in order to improve the uniformity of target ablation and to improve the homogeneity of the atomic and nanometer-scale particles.

The method combines the advantages of pulsed laser vaporization with controlled condensation in a diffusion cloud chamber under well-defined conditions of pressure and temperature. Typically, the chamber includes two horizontal metal plates separated by an insulating sidewall. The method can employ pulsed laser vaporization of at least one target into a selected gas mixture within a chamber. The target is placed in the chamber, e.g., on the lower plate, and the chamber is filled with a gas such as an inert gas or a mixture of an inert gas and a reactive gas. For example, the inert gas can comprise helium, argon or mixtures thereof, and the reactive gas can comprise oxygen. Preferably a temperature gradient is maintained between the top and bottom plates, which can create a steady convection current that can be enhanced by using a heavy gas such as argon and/or by using above atmospheric pressure conditions in the chamber. Details of suitable chambers can be found in The Journal of Chemical Physics, Vol. 52, No. 9, May 1, 1970, pp. 4733-4748, the disclosure of which is hereby incorporated by reference.

A schematic illustration of an LVCC chamber 2 suitable for production of silver-based catalysts is shown in FIG. 1. Two circular horizontal stainless steel or aluminum plates denoted as the top cold plate 4 and the bottom hot plate 6 are separated by a glass sidewall 8 with about a 6 inch outer diameter. A bulk target 10 is set on the bottom plate 6, and may be contained in a holder. The reaction chamber 2 is connected to a gas supply 12 through a gas inlet hole 14 situated on the bottom plate. The gas supply is isolated from the chamber by a control valve 16. The pressure in the chamber and within the gas lines is monitored through an optional Barocel pressure sensor and readout 18, which are coupled into the gas line. The chamber and the gas line can be evacuated to a base pressure of approximately $10^{-3}$ Torr. During each experimental run the chamber is filled with either a high purity (e.g., 99.99%) carrier gas such as He or Ar or a reactive mixture, which contains a known composition of a reactive gas (e.g., $O_2$) entrained within a carrier gas. For example, the reactive mixtures used may be oxygen in helium, or oxygen in argon. Prior to each deposition run the chamber is preferably filled and evacuated several times with the carrier gas to ensure removal of any residual impurities from the chamber. The energy source can be positioned external to the chamber such that the energy beam enters the chamber through a wall of the chamber. The ejected atoms interact with the gas mixture in the chamber. Both diffusion and convection can aid in removal of the small particles away from the nucleation zone (once condensed out of the vapor phase) before they can grow into larger particles.

The vapor can be created in the chamber by focusing onto the target the output of a laser such as the second harmonic of a Q-switched Nd—YAG laser (wavelength 532 nm; 10 ns pulse duration). Typically the laser is run at 30 Hz and delivers a power of 15-100 mJ/pulse onto the target.

Laser vaporization produces a high-density vapor within a very short time, typically $10^{-8}$ sec, in a directional jet that allows directed deposition. The collisions between the particles ejected from the target undergo Brownian motion during the gas-to-particle conversion and result in the formation of particles of the target material. Laser vaporization is possible from several different targets simultaneously or a single compound target, yielding a silver-based catalyst preferably comprising silver and/or silver oxide incorporated in particles (e.g., nanoscale or larger particles) of an oxide of a second metal. Preferably, the particles of the oxide of the second metal have an average particle size of less than about 500 nm, more preferably less than about 50 nm, most preferably less than about 10 nm.

As mentioned above, a steady convection current can be created within the chamber. The steady convection current can be achieved in two ways; either the top plate 4 is cooled such as by circulating liquid nitrogen within the plate and the bottom plate 6 is kept at a higher temperature (e.g., room temperature) or the bottom plate 6 is heated such as by circulating heating fluid within the plate or by an electrical heater and the top plate 4 is kept at a lower temperature (e.g., room temperature). For example, the top plate can be cooled to less than 150 K by circulating liquid nitrogen in fluid passages in the top plate. In either case, the top plate is kept at a temperature significantly lower than the bottom plate, which makes the top plate the condensation or deposition plate. Preferably the temperature gradient between the top plate and the bottom plate is at least about 20° C., more preferably at least 50° C. Nichrome heating wires wrapped around the glass sidewall can heat the glass sidewall to reduce deposition on the sidewall and promote a uniform temperature gradient between the two plates. The temperatures of the plates are monitored using thermocouples attached to each plate and connected in parallel to a temperature readout.

The temperature of the chamber atmosphere decreases as the top plate is approached resulting in maximum super-saturation developing in the upper half of the chamber. The higher the super-saturation, the smaller will be the size of the nucleus required for condensation. Changing the temperature gradient may enhance the super-saturation in the chamber. Convection plays a role in diffusion of the particles out of the nucleation zone before they grow larger in size. Convection within the chamber may be enhanced by increasing the temperature gradient or by using a heavier carrier gas (e.g., argon as compared to helium). In producing a silver-based catalyst, the vapor produced can be cooled or condensed by subjecting the vapor phase to collisions with an inert gas, reactive gas and/or the cold plate.

During laser ablation, if the density of the ablated particles is sufficiently low, and their relative velocities sufficiently high, particles (e.g., atoms, clusters and charged particles) from the target material can travel through the gas until they impact the surface of the cold plate or a component of a cigarette that is positioned on the cold plate where they can coalesce. On the other hand if the density of the ablated particles is sufficiently high, and their relative velocities sufficiently small, particles from the target can aggregate in the gas phase, which can then deposit on the cold plate or deposit on a component of a cigarette that is positioned on the cold plate.

Without wishing to be bound by theory, at an ablation pressure lower than about $10^{-3}$ Torr the mean free path of ablated species is sufficiently long that ablated species arrive at the cold plate without undergoing many gas phase collisions. Thus at lower reactor pressures, ablated material can deposit on a surface of the cold plate and diffuse and coalesce with each other to form particles after alighting on the cold plate. At higher pressures, such as pressures above about $10^{-3}$ Torr, the collision frequency in the gas phase of ablated species is significantly higher and nucleation and growth of the ablated species to form particles can occur in the gas phase before alighting on the surface of the cold plate. Thus at higher pressures ablated material can form a silver-based catalyst in the gas phase, which can deposit as discrete particles.

After a typical run the chamber is brought to room temperature and the sample is collected and stored under atmospheric conditions. By controlling the temperature gradient, the chamber pressure and the laser power, which can be used to determine the number density of the atoms released in the vapor phase, (e.g., on the order of $10^{14}$ atoms per pulse), the process of condensation and consequently the size and composition of the silver-based catalyst can be controlled.

The operating pressure in the chamber is preferably greater than about $10^{-3}$ Torr, and more preferably about 760 Torr. The temperature gradient can be adjusted by altering the temperatures of the top and/or bottom plates of the chamber. The temperature of the upper plate is preferably between about $-150°$ C. and 30° C. The temperature of the lower plate is preferably between about 20° C. and 150° C. It should be appreciated that although the LVCC apparatus described above has a top plate that is cooled relative to a bottom plate, this geometry can be reversed (e.g., the top plate can be heated relative to the bottom plate).

The LVCC method is preferably performed with an inert environment of helium and/or argon at pressures higher than atmospheric pressure in the chamber, which reduces the possibility of atmospheric contamination during the synthesis. However, as indicated above, the reaction may also be carried out at pressures lower than atmospheric pressure.

An added advantage of the method is the capability of preparing selected metal and metal oxide particles by precisely introducing known concentrations of a reactive (e.g., oxidizing) gas such as oxygen into the reaction chamber. The introduction of reactive gases into the chamber during the deposition process allows material ablated from the target to combine with such gases to obtain oxide nanoscale particles. Thus, in reactive ablation the chamber includes a small proportion of a reactive gas, such as air, oxygen, water vapor, etc., which reacts with the atoms of the target material to form particles comprising a metal oxide. The target can consist essentially of silver or silver oxide, whereby particles of silver or silver oxide can be produced, or the target can comprise silver (e.g., silver and/or silver oxide) and a second metal. By providing a target comprising silver and a second metal, a supported silver-based catalyst can be formed directly. The second metal can be a metal or a metal oxide of one or more metals selected from the group consisting of Mg, Al, Si, Ti, V, Cr, Mn, Fe, Y, Zr, Nb, Ce and Hf. A target comprising a second metal preferably comprises a second metal in the form of a metal oxide. For example, a silver-cerium oxide catalyst may be formed by reactively ablating a silver-cerium target in a chamber comprising argon and oxygen. Preferably the silver-cerium oxide catalyst comprises nanoscale particles that comprise silver (e.g., Ag, AgO and/or $Ag_2O$) that are incorporated in nanoscale particles of the oxide of cerium (e.g., $CeO_{2-x}$).

In addition to reactive ablation, silver-based catalysts can be formed via ablation from a target comprising silver metal and cerium oxide. For example, a silver-cerium oxide catalyst may be formed by ablating a pressed powder target of silver metal and cerium oxide in a chamber comprising argon.

The microstructure of the silver-based catalyst can be controlled using ablation. Particle density, phase distribution and the extent and morphology of crystalline (versus amorphous) phases can be controlled by varying, for example, the pressure, laser energy and temperature of the cold plate. The composition of a silver-based catalyst, including the ratio of the silver and/or silver oxide to the oxide of the second metal, can be controlled by controlling the composition of the target.

Advantageously, ablation allows for dry, solvent-free, simultaneous formation and deposition of silver-based catalysts under sterile conditions. According to an embodiment, the silver-based catalysts can be used to catalyze and/or oxidize the conversion of carbon monoxide to carbon dioxide in the mainstream smoke of a cigarette.

An embodiment relates to a method of making a cigarette comprising the steps of (i) incorporating a silver-based catalyst in at least one of tobacco cut filler, cigarette paper and cigarette filter material; (ii) providing the tobacco cut filler to a cigarette making machine to form a tobacco column; (iii) placing the cigarette paper around the tobacco column to form a tobacco rod of a cigarette; and (iv) optionally attaching a cigarette filter comprising the cigarette filter material to the tobacco rod using tipping paper.

By incorporating a silver-based catalyst into the tobacco cut filler, cigarette paper and/or cigarette filter material of a cigarette, the silver-based catalyst can reduce the amount of carbon monoxide in mainstream smoke during smoking via catalysis and/or oxidation of carbon monoxide to carbon dioxide. The silver-based catalyst can also reduce the total amount of particulate matter (e.g., tar) drawn through a cigarette during smoking.

Preferably, the silver-based catalysts are incorporated in tobacco cut filler, cigarette paper and/or cigarette filter material in an amount effective to reduce the ratio in mainstream smoke of carbon monoxide to carbon dioxide by at least 5% (e.g., by at least 15%, 20%, 25%, 30%, 35%, 40% or 45%). Preferably, the catalyst is present in an amount effective to convert at least 5% of the carbon monoxide to carbon dioxide at a temperature of less than about 210° C. or less than about 100° C.

"Smoking" of a cigarette means the heating or combustion of the cigarette to form smoke, which can be drawn through the cigarette. Generally, smoking of a cigarette involves lighting one end of the cigarette and, while the tobacco contained therein undergoes a combustion reaction, drawing the cigarette smoke through the mouth end of the cigarette. The cigarette may also be smoked by other means. For example, the cigarette may be smoked by heating the cigarette and/or heating using electrical heater means, as described in commonly-assigned U.S. Pat. Nos. 6,053,176; 5,934,289; 5,591,368 or U.S. Pat. No. 5,322,075.

The term "mainstream" smoke refers to the mixture of gases passing down the tobacco rod and issuing through the filter end, i.e., the amount of smoke issuing or drawn from the mouth end of a cigarette during smoking of the cigarette.

In addition to the constituents in the tobacco, the temperature and the oxygen concentration can affect the formation and reaction of carbon monoxide and carbon dioxide. The total amount of carbon monoxide formed during smoking comes from a combination of three main sources: thermal decomposition (about 30%), combustion (about 36%) and reduction of carbon dioxide with carbonized tobacco (at least 23%). Formation of carbon monoxide from thermal decomposition, which is largely controlled by chemical kinetics, starts at a temperature of about 180° C. and finishes at about 1050° C. Formation of carbon monoxide and carbon dioxide during combustion is controlled largely by the diffusion of oxygen to the surface ($k_a$) and via a surface reaction ($k_b$). At 250° C., $k_a$ and $k_b$ are about the same. At 400° C., the reaction becomes diffusion controlled. Finally, the reduction of carbon dioxide with carbonized tobacco or charcoal occurs at temperatures around 390° C. and above.

During smoking there are three distinct regions in a cigarette: the combustion zone, the pyrolysis/distillation zone, and the condensation/filtration zone. While not wishing to be bound by theory, it is believed that the silver-based catalysts can target the various reactions that occur in different regions of the cigarette during smoking.

First, the combustion zone is the burning zone of the cigarette produced during smoking of the cigarette, usually at the lighted end of the cigarette. The temperature in the combustion zone ranges from about 700° C. to about 950° C., and the heating rate can be as high as 500° C./second. Because oxygen is being consumed in the combustion of tobacco to produce carbon monoxide, carbon dioxide, water vapor and various organic compounds, the concentration of oxygen is low in the combustion zone. The low oxygen concentrations coupled with the high temperature leads to the reduction of carbon dioxide to carbon monoxide by the carbonized tobacco. In this region, the silver-based catalysts can convert carbon monoxide to carbon dioxide via an oxidation mechanism. The combustion zone is highly exothermic and the heat generated is carried to the pyrolysis/distillation zone.

The pyrolysis zone is the region behind the combustion zone, where the temperatures range from about 200° C. to about 600° C. The pyrolysis zone is where most of the carbon monoxide is produced. The major reaction is the pyrolysis (i.e., the thermal degradation) of the tobacco that produces carbon monoxide, carbon dioxide, smoke components and charcoal using the heat generated in the combustion zone. There is some oxygen present in this region, and thus the silver-based catalysts may catalyze the oxidation of carbon monoxide to carbon dioxide. In the pyrolysis zone the silver-based catalysts can also directly oxidize the conversion of CO to $CO_2$.

In the condensation/filtration zone the temperature ranges from ambient to about 150° C. The major process in this zone is the condensation/filtration of the smoke components. Some amount of carbon monoxide and carbon dioxide diffuse out of the cigarette and some oxygen diffuses into the cigarette. The partial pressure of oxygen in the condensation/filtration zone does not generally recover to the atmospheric level. In the condensation/filtration zone, the silver-based catalysts can catalyze and/or oxidize the conversion of carbon monoxide to carbon dioxide.

As used herein, a catalyst is capable of affecting the rate of a chemical reaction, e.g., a catalyst can increase the rate of oxidation of carbon monoxide to carbon dioxide without participating as a reactant or product of the reaction. An oxidant is capable of oxidizing a reactant, e.g., by donating oxygen to the reactant, such that the oxidant itself is reduced. A reducing agent is capable of reducing a reactant, e.g., by receiving oxygen from the reactant, such that the reducing agent itself is oxidized.

According to a preferred method, the silver-based catalysts are incorporated in tobacco cut filler, cigarette paper and/or cigarette filter material used to form a cigarette. The silver-based catalysts preferably have an average particle size less than about 100 nm, preferably less than about 50 nm, more preferably less than about 10 nm.

Cerium oxide ($CeO_{2-x}$) (x>0) is a preferred support in the silver-based catalyst because cerium oxide can act both as a support in synergy with the silver and/or silver oxide and an active metal oxide oxidation catalyst. An equilibrium between $Ce^{3+}$ and $Ce^{4+}$ can result in an exceptionally high oxygen storage and release capacity that enables catalytic combustion of CO by providing oxygen directly to catalytically active sites. Also, $CeO_{2-x}$ is less susceptible to deactivation from water vapor and more resistant to sintering than other oxides such as $Al_2O_3$.

The silver-based catalysts as described above may be provided continuously along the length of a tobacco rod or at discrete locations along the length of a tobacco rod. Furthermore, the silver-based catalysts may be homogeneously or non-homogeneously distributed along the length of a tobacco rod. The silver-based catalysts may be added to cut filler tobacco stock supplied to a cigarette-making machine or incorporated directly in a tobacco rod prior to wrapping cigarette paper around the cigarette rod. The silver-based catalysts may be deposited directly on and/or incorporated in cigarette paper before or after the cigarette paper is incorporated into a cigarette.

Silver-based catalysts will preferably be distributed throughout the tobacco rod, cigarette filter material and/or along the cigarette paper portions of a cigarette. By providing the silver-based catalysts throughout one or more components of a cigarette it is possible to reduce the amount of carbon monoxide drawn through the cigarette.

The amount of the silver-based catalysts can be selected such that the amount of carbon monoxide in mainstream smoke is reduced during smoking of a cigarette. Preferably, the amount of the silver-based catalysts will be a catalytically effective amount, e.g., an amount sufficient to catalyze and/or oxidize at least 10% of the carbon monoxide in mainstream smoke, more preferably at least 25%.

One embodiment provides a method for forming the silver-based catalysts and then depositing the silver-based catalysts on and/or incorporating them in tobacco cut filler in forming a cigarette. Any suitable tobacco mixture may be used for the cut filler. Examples of suitable types of tobacco materials include flue-cured, Burley, Md. or Oriental tobaccos, the rare or specialty tobaccos, and blends thereof. The tobacco material can be provided in the form of tobacco lamina, processed tobacco materials such as volume expanded or puffed tobacco, processed tobacco stems such as cut-rolled or cut-puffed stems, reconstituted tobacco materials, or blends thereof. The tobacco can also include tobacco substitutes.

In cigarette manufacture, the tobacco is normally employed in the form of cut filler, i.e., in the form of shreds or strands cut into widths ranging from about 1/10 inch to about 1/20 inch or even 1/40 inch. The lengths of the strands range from between about 0.25 inches to about 3.0 inches. The cigarettes may further comprise one or more flavorants or other additives (e.g., burn additives, combustion modifying agents, coloring agents, binders, etc.) known in the art.

If the silver-based catalysts are located in the filter element of a cigarette, the filter may be a mono filter, a dual filter, a triple filter, a cavity filter, a recessed filter or a free-flow filter. The silver-based catalysts can be incorporated into one or more filter parts selected from the group consisting of: shaped paper insert, a plug, a space between plugs, cigarette filter paper, plug wrap, a cellulose acetate sleeve, a polypropylene sleeve, and a free-flow sleeve.

A further embodiment provides a method of making a cigarette comprising the silver-based catalysts. Techniques for cigarette manufacture are known in the art. Any conventional or modified cigarette making technique may be used to incorporate catalysts. The resulting cigarettes can be manufactured to any known specifications using standard or modified cigarette making techniques and equipment. The cut filler composition is optionally combined with other cigarette additives, and provided to a cigarette-making machine to produce a tobacco column, which is then wrapped in cigarette paper, and optionally tipped with filters.

Cigarettes may range from about 50 mm to about 120 mm in length. Generally, a regular cigarette is about 70 mm long, a "King Size" is about 85 mm long, a "Super King Size" is about 100 mm long, and a "Long" is usually about 120 mm in length. The circumference is from about 15 mm to about 30 mm in circumference, and preferably around 25 mm. The tobacco packing density is typically between the range of about 100 $mg/cm^3$ to about 300 $mg/cm^3$, and preferably 150 $mg/cm^3$ to about 275 $mg/cm^3$.

Silver-based catalysts were analyzed using x-ray diffraction and scanning electron microscopy (SEM). X-Ray diffraction (XRD) patterns were obtained using a Philips X'Pert Materials Research Diffractometer that uses Cu $K_{\alpha 1}$ radiation. The size and shape of agglomerates and individual particles were investigated using a JEOL Model 35-C scanning electron microscope.

Commercially available silver powders were procured from Argonide Corporation (Sanford, Fla.). As-received, the powders were shown by SEM and XRD to comprise 10-40 micron sized agglomerates of nanoscale metallic silver particles. The individual particle size was approximately 100 nm.

Figure 2:
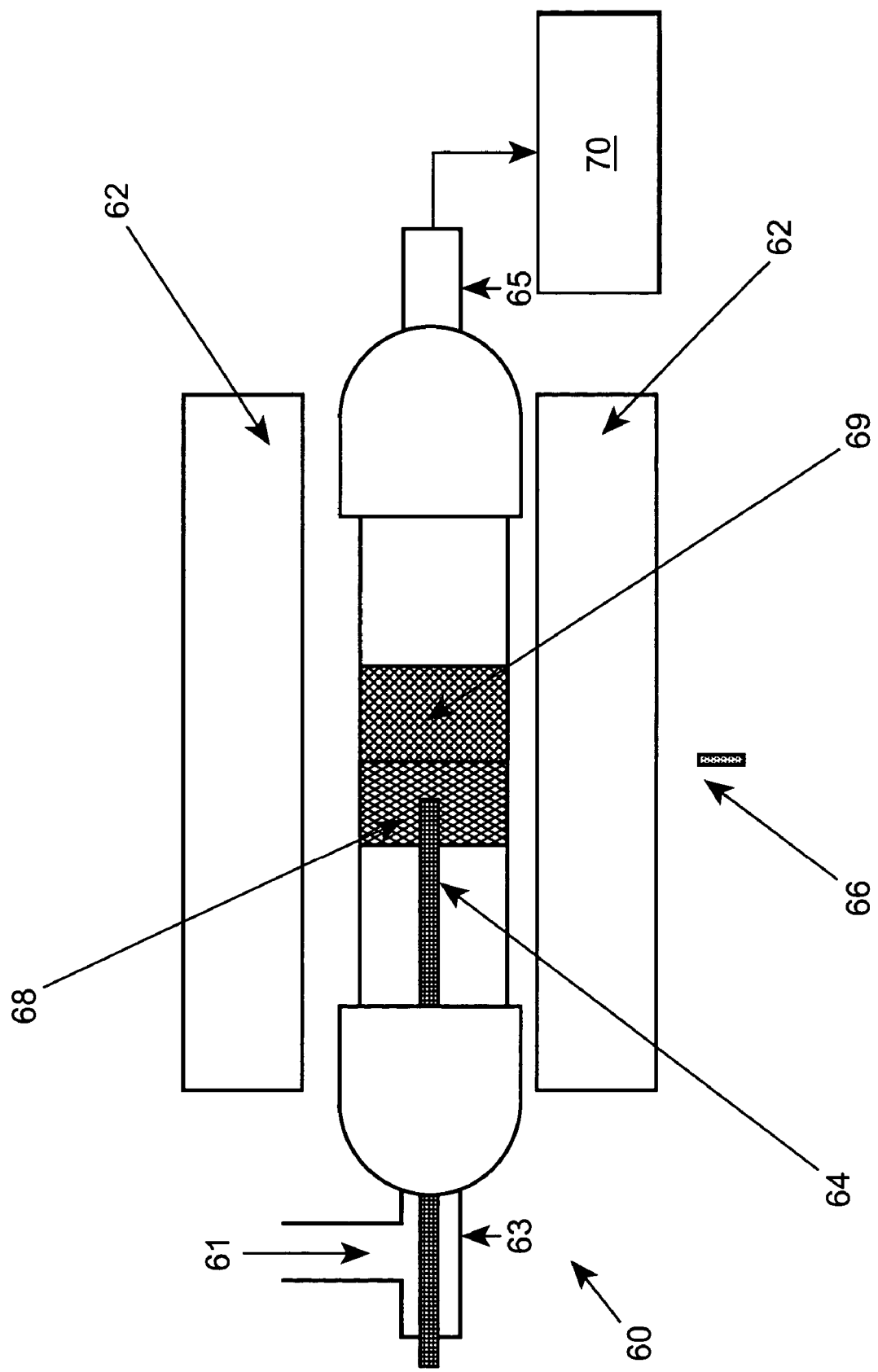
FIG. 2 shows a schematic of a quartz flow tube reactor.

The activity of the commercially available silver-based catalyst was evaluated using a continuous flow packed bed reactor. An illustration of a packed bed reactor 60 positioned within a programmable tube furnace 62 is shown in FIG. 2. Thermocouples 64 and 66 are used to monitor the temperature of the silver-based catalyst and the furnace 62, respectively. To evaluate the ability of the silver-based catalyst to reduce the concentration of carbon monoxide, about 25 mg of the silver-based catalyst is dusted onto quartz wool 68 and placed in the middle of the reactor. A filter pad 69 can be used to prevent particulate material from entering the gas analyzer 70, which is located at a downstream side 65 of the reactor. An input reactant gas mixture 61 is introduced at an upstream side 63 of the reactor and is passed over the silver-based catalyst and through the reactor at a flow rate of about 1 liter/mm. After attaining a steady state flow of gas, the temperature of the furnace is increased at a heating rate of about 15° C./min. and the gas that passes over the silver-based catalyst and emerges from the downstream side of the reactor is analyzed by a NLT2000 multi-gas analyzer 70, which measures the concentration of CO, $CO_2$ and $O_2$ in the gas.

Multiple test runs were conducted on a given test sample. To conduct more than a single test runs, a sample is placed in the reactor as described above and the concentration of CO, $CO_2$ and $O_2$ is measured as a function of reactor temperature until a maximum conversion of CO to $CO_2$ is observed. The sample is then cooled to room temperature and the measurement is repeated in a subsequent heating cycle. A first heating cycle is referred to as Run A, and second and third heating cycles are referred to as Run B, Run C, etc. The runs were repeated until two consecutive runs showed similar light-off temperatures (temperature at which 5% of the CO is converted to $CO_2$).

Figure 3:
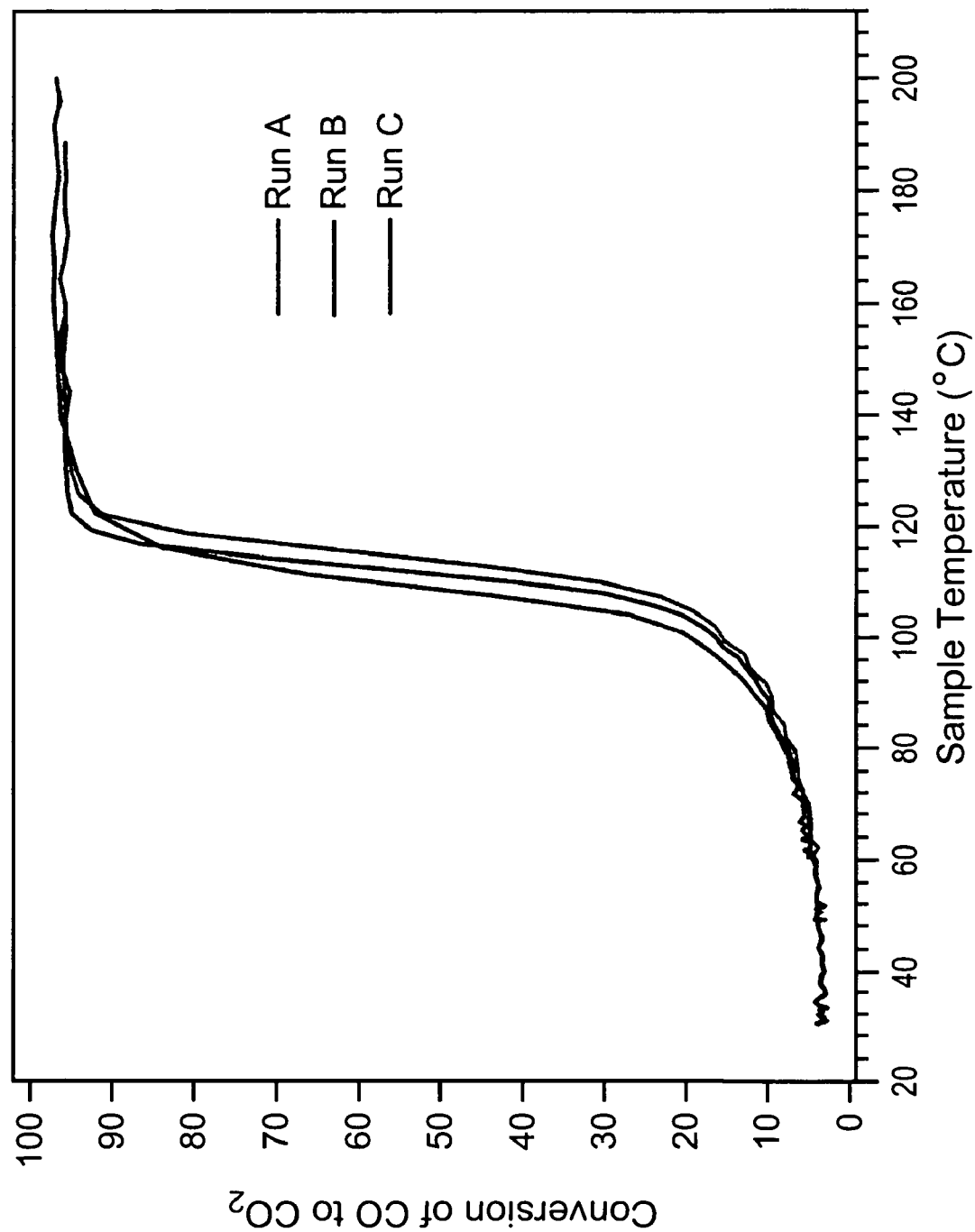
FIG. 3 shows the conversion of CO to $CO_2$ for a silver-based catalyst comprising silver particles.

Carbon monoxide conversion data for the commercially available silver particles is shown in FIG. 3. An input gas mixture comprising 3.5% CO and 21% $O_2$ (balance argon) was used. The data show that the temperature at which 5% of the carbon monoxide is converted to carbon dioxide ($T_5$) is approximately 80° C. for each of the successive runs A-C. The temperature at which 5% of the carbon monoxide is converted to carbon dioxide is referred to as the light-off temperature.

Activity of the commercially available silver particles was also evaluated by incorporating this silver-based catalyst into hand-made cigarettes that were in turn smoked using a standard smoking machine. Compared to a control cigarette that contained no silver-based catalyst, the uniform addition of 160 mg and 400 mg of the silver particles to the tobacco cut filler of the test cigarettes resulted in a 30% and 44% decrease, respectively, in the concentration of carbon monoxide in mainstream smoke drawn through the test cigarette.

Silver-based catalysts can be prepared by precipitating a silver salt to form particles comprising silver. For example, particles of silver oxide were prepared by adding a 0.1 Normal solution of sodium hydroxide to an aqueous solution of silver nitrate. The as-precipitated product was washed with distilled water, dried at 90° C. in a vacuum oven and tested in the flow tube reactor described above.

Figure 4:
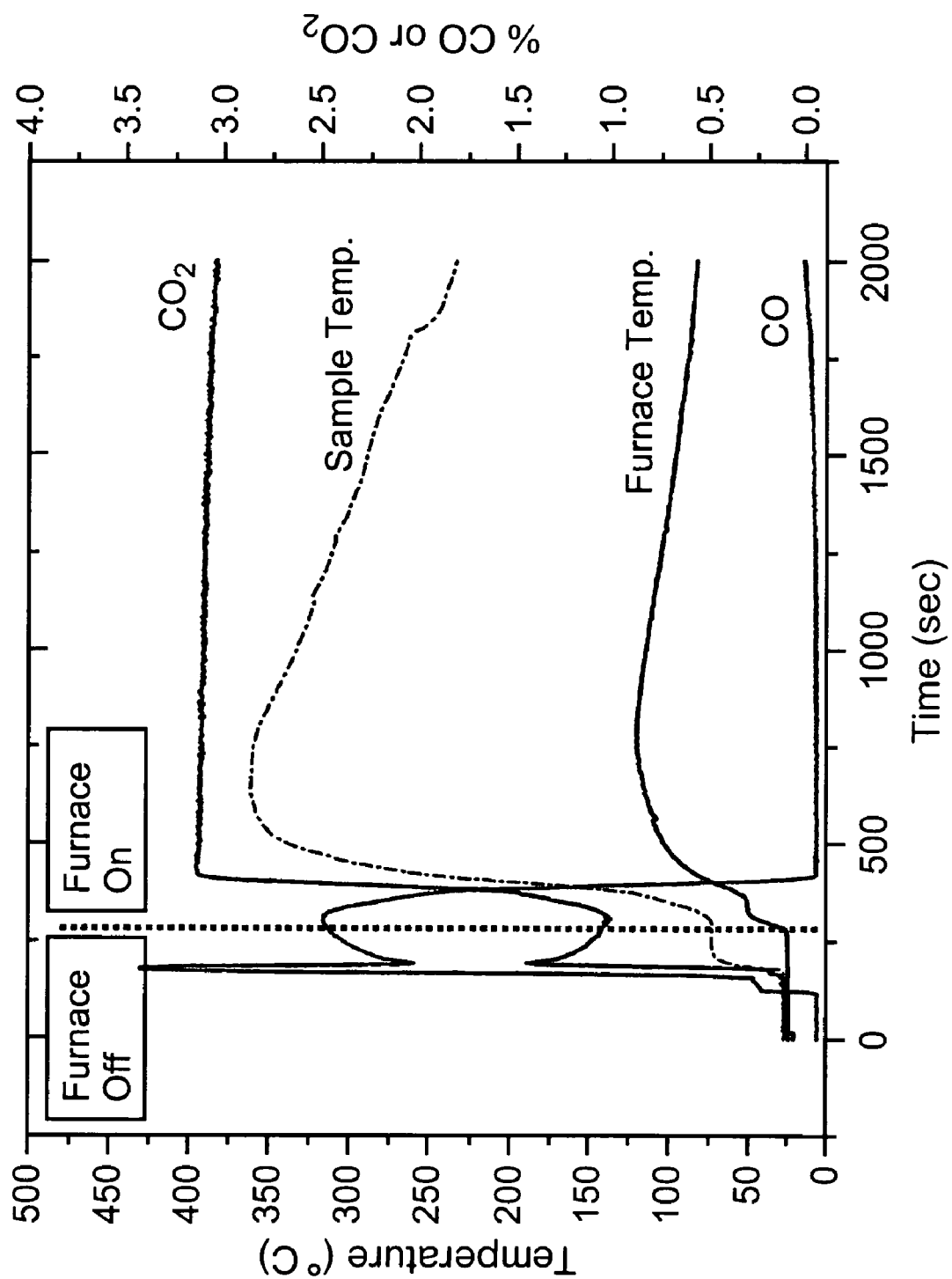
FIG. 4 shows the conversion of CO to $CO_2$ for a silver-based catalyst comprising as-precipitated silver oxide particles.

Initially, the as-precipitated silver oxide particles were tested at ambient temperature (e.g., without external heating by the furnace). Referring to FIG. 4, using a gas input mixture of 3% CO-21% $O_2$ (balance argon), 120 mg of the silver oxide particles achieved a maximum of 33% CO conversion at room temperature. By supplying external heat, the catalytic activity increased and achieved 100% CO conversion at a catalyst temperature of about 290° C.

X-ray diffraction of the as-precipitated silver oxide particles showed reflections consistent with nanoscale particles of silver oxide ($Ag_2O$). After heating the particles while flowing the $CO/O_2/Ar$ gas mixture over the particles, the x-ray diffraction peaks correspond to metallic silver having an average particle size greater than that for the as-precipitated silver oxide. Thus, during the CO test, the silver oxide is reduced (e.g., gives up oxygen) which allows the silver oxide to function as an oxidant for the conversion of CO to $CO_2$.

Figure 5:
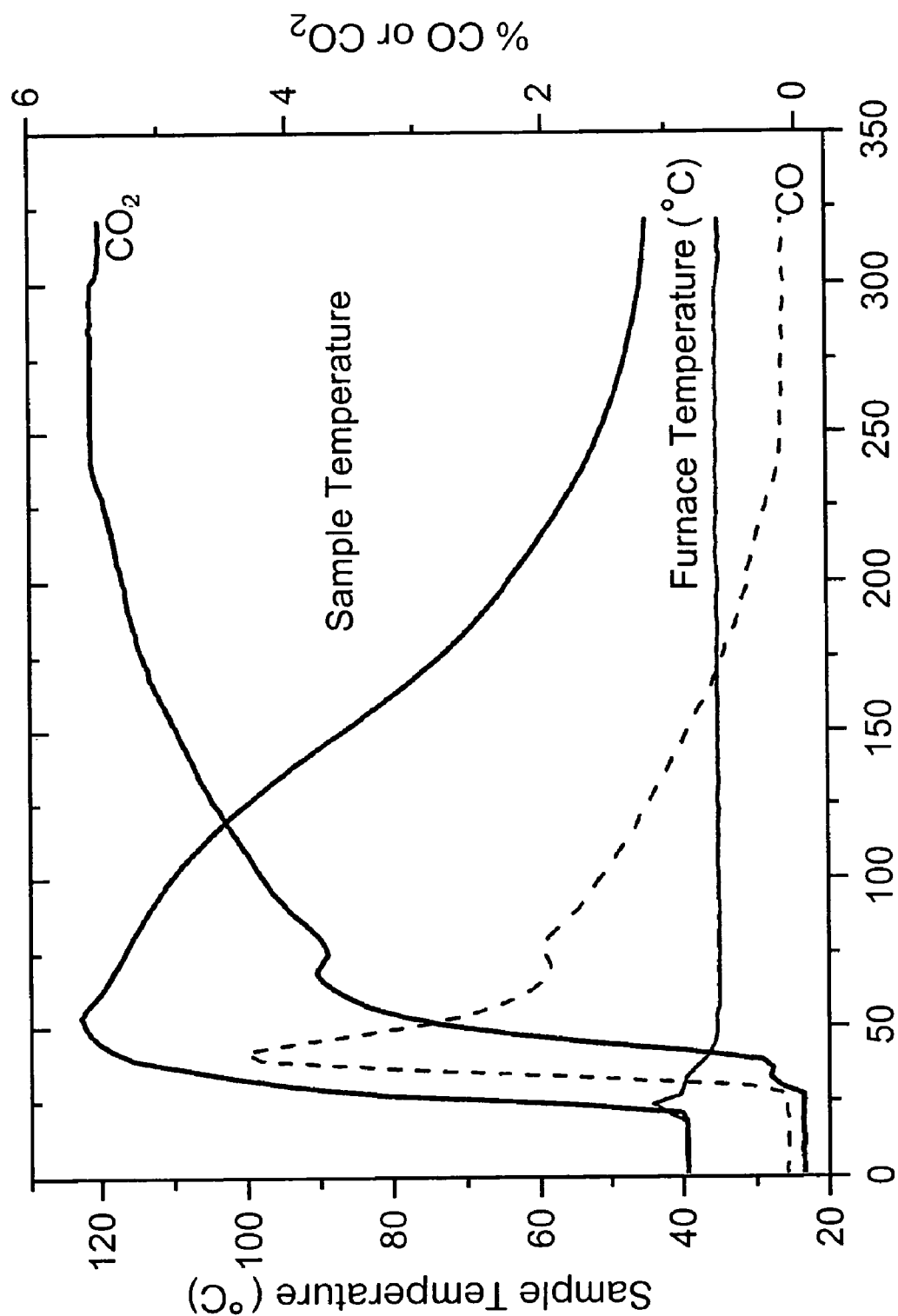
FIG. 5 shows the conversion of CO to $CO_2$ for a silver-based catalyst comprising as-precipitated silver oxide particles.

The as-precipitated silver oxide particles can convert carbon monoxide to carbon dioxide in the absence of an external source of oxygen, e.g., in an oxygen-depleted zone of a smoking mixture. As shown in FIG. 5, the as-precipitated silver oxide particles were tested at room temperature using a gas flow comprising 6% CO (balance argon). A sample comprising 200 mg of the particles achieved a maximum of 66% CO conversion. The silver oxide can provide a source of oxygen for the direct oxidation of CO to $CO_2$. Because the reduction of silver oxide to metallic silver is an exothermic reaction, the sample temperature during the CO test increases while the silver oxide is being consumed (i.e., reduced to silver metal).

Figure 6:
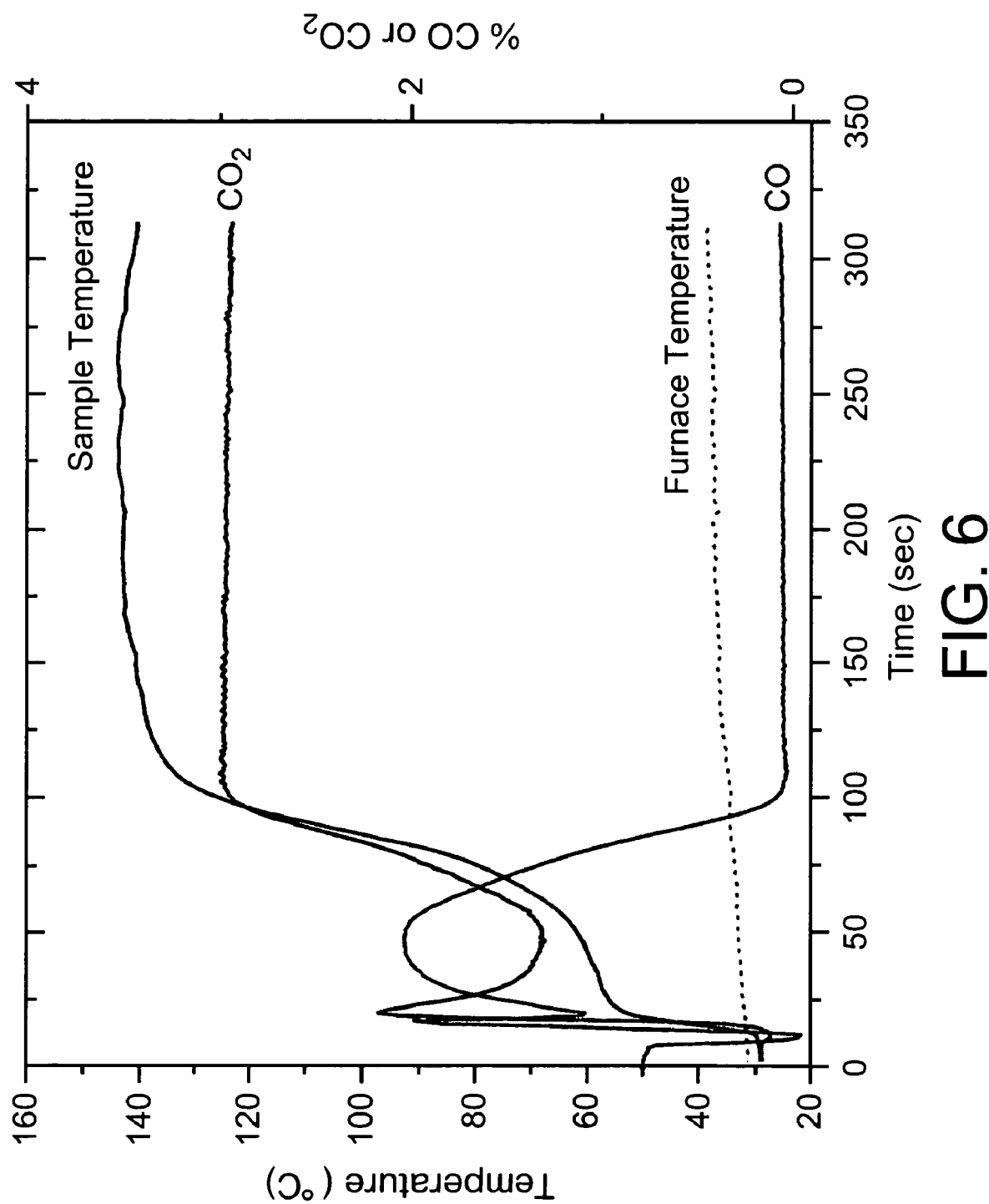
FIG. 6 shows the conversion of CO to $CO_2$ for a silver-based catalyst comprising a mixture of silver particles and as-precipitated silver oxide particles.

The increase in catalyst temperature of the precipitated silver oxide particles during the CO test can be used to initiate catalytic activity of other catalysts, particularly those that have a light off temperature greater than room temperature. Carbon monoxide test data for a particle mixture comprising as-precipitated silver oxide particles and commercially available silver particles is shown in FIG. 6. The sample, which comprised 80 mg of $Ag_2O$ and 40 mg of the commercially available silver, was tested at ambient temperature using an input gas flow of 3% CO and 21% $O_2$ (balance argon). The admixed particles achieved 100% CO conversion without external heating and remained active for a period of more than 5 hours.

Figure 7:
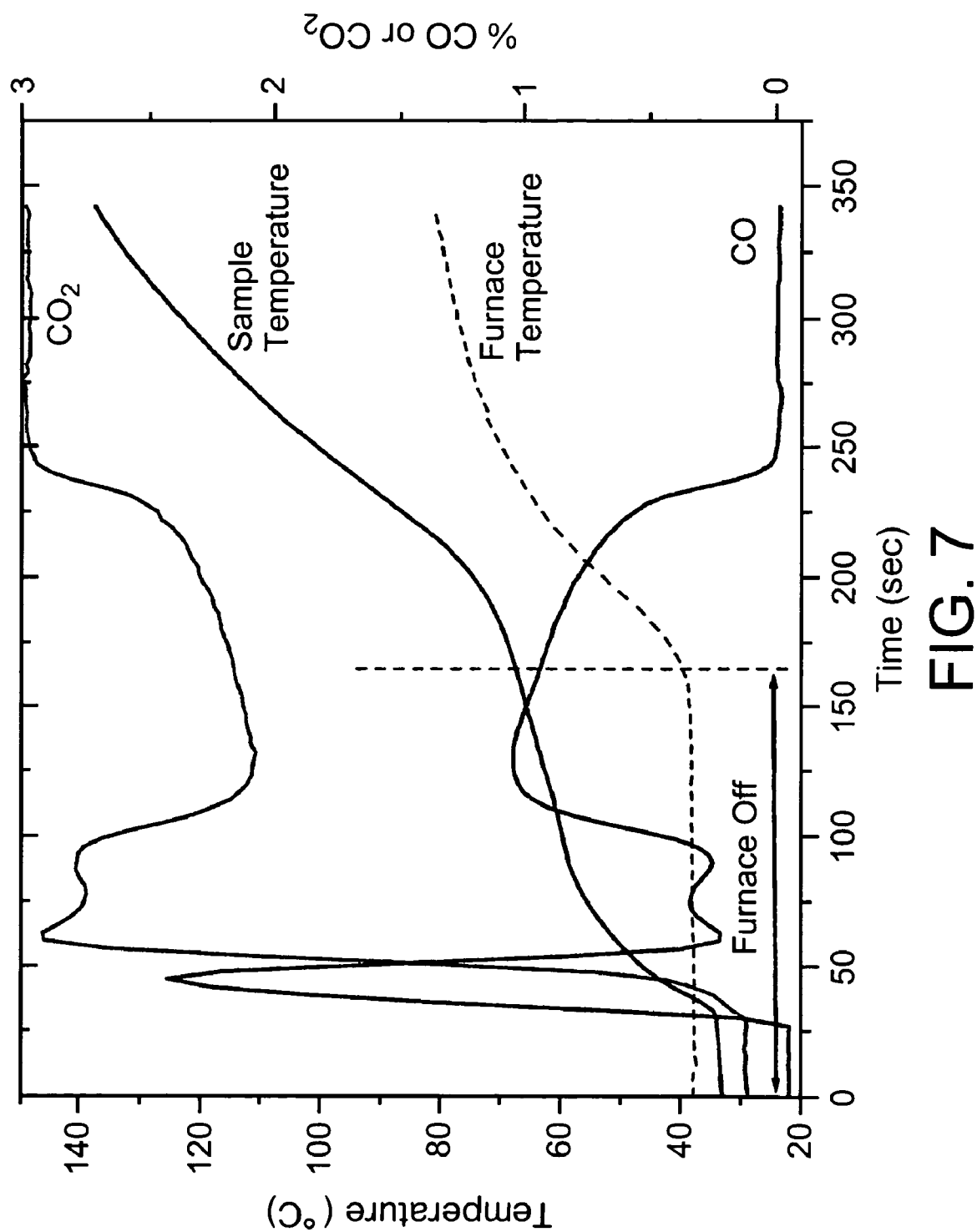
FIG. 7 shows the conversion of CO to $CO_2$ for a silver-based catalyst comprising cerium oxide-supported silver oxide particles.

A catalyst support can be used to stabilize activity of the catalyst and disperse the active species. Supported silver-based catalysts can be prepared by mixing the as-precipitated silver oxide particles with particles of an oxide of a second metal. The silver-based catalysts preferably comprises from about 1 to 70% by weight silver and/or silver oxide particles supported on nanoscale or micron-sized particles of the oxide support particles. Carbon monoxide test data for a 40 wt. % silver oxide/60 wt. % cerium oxide silver-based catalyst is shown in FIG. 7. The average size of the cerium oxide particles is about 1 micron. Using an input gas mixture of 3% CO and 21% $O_2$ (balance argon), approximately 150 mg of the sample achieved a maximum of 90% conversion of CO to $CO_2$ without external furnace heating. While the CO to $CO_2$ conversion rate decreased over time without external heating of the catalyst material, by providing external heating of the catalyst material the catalytic activity returns. When the sample temperature was increased via external heating to about 110° C., greater than 90% conversion of CO to $CO_2$ was achieved. The improved activity of the mixture compared to the as-precipitated product may be due to dispersion of the active species (e.g., silver) in the mixture.

Referring to Table I, the maximum conversion of CO achieved without heating the furnace and the sample temperature at which 90% conversion was achieved is shown for cerium oxide supported silver-based catalysts having different compositions.

TABLE I

Maximum CO Conversion and $T_{90}$ Data for Supported Silver-Based Catalyst

| Composition (wt. % $Ag_2O$) Balance $CeO_2$ | Maximum CO conversion (%) without furnace heating | Furnace temperature for 90% CO conversion (° C.) |
| --- | --- | --- |
| 10 | 27 | 390 |
| 20 | 38 | 160 |
| 30 | 50 | 110 |
| 40 | 90 | 110 |

Activity of the cerium oxide supported silver-based catalysts was also evaluated by incorporating the catalysts into hand-made cigarettes. Compared to a control cigarette that contained no silver-based catalyst, the addition of 400 mg samples comprising 20 and 40 wt. % of the as-precipitated silver oxide supported on cerium oxide resulted in about a 42% and a 45% decrease, respectively, in the concentration of carbon monoxide drawn through the test cigarette. In addition to reducing the concentration of CO, when tested in an experimental cigarette, the silver-based catalyst also reduced the concentration of total particulate matter drawn through the test cigarette by about 35% as compared with a control cigarette.

The silver-based catalysts can optionally comprise one or more different oxide supports. In place of cerium oxide, the oxide support can comprise, for example, titanium oxide. A 400 mg sample comprising 40 wt. % of the as-precipitated silver oxide supported on titanium oxide resulted in about a 42% decrease in the concentration of carbon monoxide drawn through a test cigarette.

As discussed above, silver supported on metal oxide supports can be made by vaporization deposition. In a preferred embodiment, the LVCC method may be used to prepare supported silver-based catalysts using pressed powder targets. Targets comprising 5 or 10 wt. % silver in cerium oxide were used. The composition of a silver-based catalyst derived via LVCC is defined herein as the composition of the target from which it is obtained. The LVCC-derived silver-based catalysts comprise silver and/or silver oxide incorporated in and/or on nanoscale particles of cerium oxide.

Figure 8:
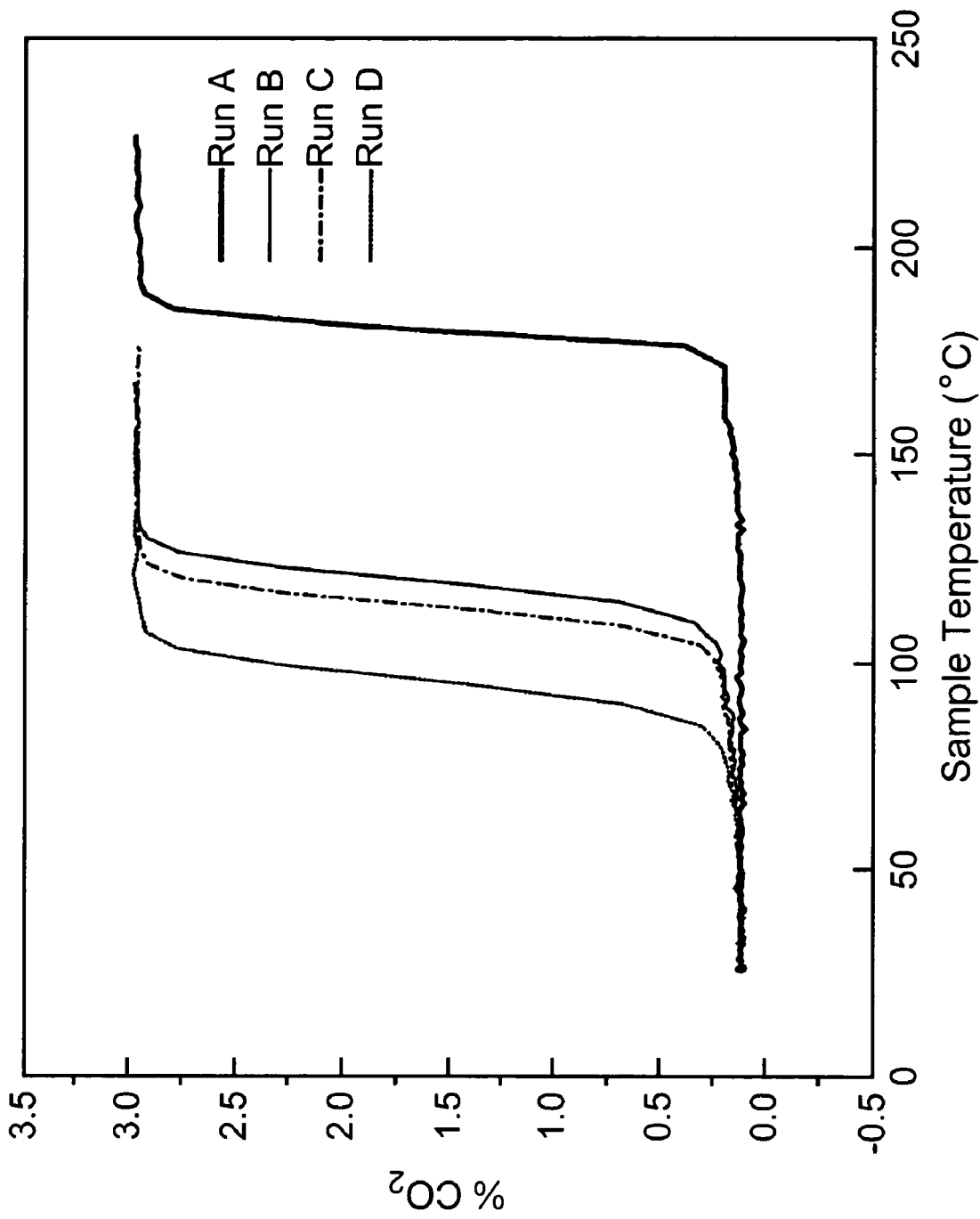
FIG. 8 shows the conversion of CO to $CO_2$ for a silver-based catalyst comprising cerium oxide-supported silver particles prepared by LVCC.
Figure 9:
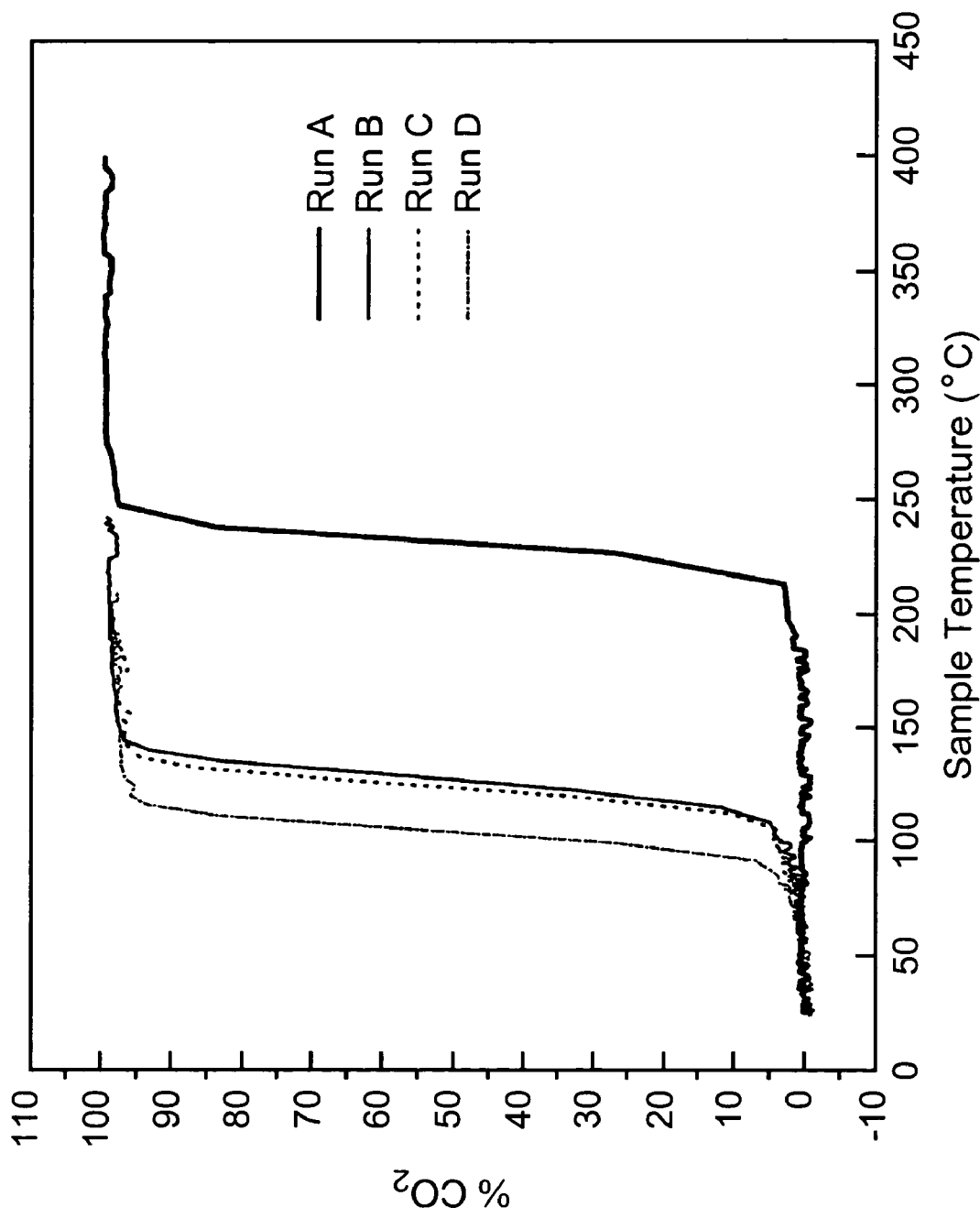
FIG. 9 shows the conversion of CO to $CO_2$ for a silver-based catalyst comprising cerium oxide-supported silver particles prepared by LVCC.

The catalytic activity of the LVCC-derived silver-based catalysts was tested using the tube furnace apparatus described in FIG. 2. A 3% CO-21% $O_2$ (balance argon) gas flow was used. As shown in FIG. 8 for a 25 mg sample of a silver-based catalyst comprising 10 wt. % silver/90 wt. % cerium oxide, the light off temperature decreases from about 195° C. to about 80° C. with successive runs (A-D) and nearly 100% CO conversion is achieved at about 100° C. in the fourth run. A 20 mg sample of a silver-based catalyst comprising 5 wt. % silver/95 wt. % cerium oxide silver-based catalyst achieved similar results, as shown in FIG. 9.

The catalyst can be heat treated to vary the properties of the catalyst. For example, heating (i.e., calcining) of the silver-based catalyst prior to incorporating the silver-based catalyst in and/or on the at least one of tobacco cut filler, cigarette paper and cigarette filter material can be used to enhance the catalytic activity of the silver-based catalyst. Preferably, if calcined prior to incorporation into the component of a cigarette, the silver-based catalysts are heated in an oxidizing atmosphere, although it is also possible to perform the calcining in a reducing and/or inert atmosphere.

The effect of heat-treatment on cerium oxide supported silver-based catalysts made via LVCC is summarized in Table II. The data show the first run light off temperature ($T_5$) and the first run temperature for 95% CO conversion ($T_{95}$) for samples pre-heat-treated in a 20% $O_2$ (balance argon) gas mixture. Carbon monoxide conversion data for the silver-based catalysts tested without initially calcining the samples is shown for comparison. The light-off temperature and 95% CO conversion temperature decreased during subsequent runs. For example, in the fourth run the light off temperature of the 5 wt. % and the 10 wt. % Ag—$CeO_2$ catalysts that received no pre-measurement heat treatment was reduced to 90° C. and 80° C., respectively. The fourth run 95% conversion temperatures for these samples was about 160° C. and 100° C., respectively.

TABLE II

Effect of Calcining on the Catalytic Activity of Silver-based Catalysts.

| Sample | Pre-Measurement Heat treatment | $T_5$ (° C.) | $T_{95}$ (° C.) |
|---|---|---|---|
| 5% Ag—$CeO_2$ | None | 210 | 250 |
| 10% Ag—$CeO_2$ | None | 170 | 195 |
| 5% Ag—$CeO_2$ | 300° C., 45 min. | 90 | 160 |
| 5% Ag—$CeO_2$ | 300° C., 120 min. | 80 | 100 |
| 10% Ag—$CeO_2$ | 300° C., 120 min. | 75 | 110 |
| 5% Ag—$CeO_2$ | 400° C., 120 min. | 100 | 145 |

As shown in Table II, pre-heat-treatment of the LVCC silver-based catalysts significantly reduces the light-off temperatures, e.g., the light-off temperatures can be reduced by at least 50° C., 100° C. or more. The $CeO_2$ supported silver-based catalyst promotes oxidation of CO at elevated temperatures.

Long term catalytic activity was measured using an LVCC-derived silver-based catalyst comprising 5 wt. % silver-cerium oxide dusted onto quartz wool and positioned in the reactor as described above. Prior to placement in the furnace the sample was calcined at 300° C. in 20% $O_2$ (balance argon) for 120 minutes. During the experiment, the furnace was maintained at a temperature of 125° C. For a 4 hour test period, the catalyst maintained a conversion efficiency of greater than 95%.

The silver-based catalysts may be used in a variety of applications. For example, the catalyst may be incorporated into a hydrocarbon conversion reactor in an amount effective to convert hydrocarbons. The catalyst may be incorporated into a vehicle exhaust emissions system in an amount effective to oxidize carbon monoxide to carbon dioxide. The catalyst may also be used for emissions reduction in the cold starting of an automobile engine in an amount effective to oxidize carbon monoxide to carbon dioxide. In another embodiment, the catalyst may be incorporated into a laser in an amount effective to oxidize carbon monoxide to carbon dioxide. In another embodiment, the catalyst can be incorporated into a fuel cell in an amount effective to oxidize carbon monoxide to carbon dioxide. In yet another embodiment, the catalyst can be used in an air filter for the conversion of carbon monoxide and/or indoor volatile organic compounds.

While the invention has been described with reference to preferred embodiments, it is to be understood that variations and modifications may be resorted to as will be apparent to those skilled in the art. Such variations and modifications are to be considered within the purview and scope of the invention as defined by the claims appended hereto.

All of the above-mentioned references are herein incorporated by reference in their entirety to the same extent as if each individual reference was specifically and individually indicated to be incorporated herein by reference in its entirety.

What is claimed is:

1. A component of a cigarette comprising a particulate catalyst for the conversion of carbon monoxide to carbon dioxide, wherein the catalyst comprises agglomerates of nanoscale particles comprising silver and/or silver oxide supported in and/or on support particles of cerium oxide, wherein the component is selected from the group consisting of tobacco cut filler, cigarette paper and cigarette filter material, and wherein the catalyst has been heat treated under conditions which provide a light off temperature of not more than 100° C. in a gas flow consisting of 3% CO, 21% $O_2$ and balance argon, wherein the light off temperature is a temperature for 5% CO conversion.

2. The component of claim 1, wherein the catalyst has been heat treated at 300 to 400° C. and consists essentially of the agglomerates of nanoscale particles comprising silver and/or silver oxide supported in and/or on cerium oxide particles.

3. The component of claim 1, wherein the particles comprising silver and/or silver oxide have an average particle size of less than about 100 nm.

4. The component of claim 1, wherein the agglomerates of nanoscale particles have an average size of from about 1 to 50 microns.

5. The component of claim 4, wherein the agglomerates of nanoscale particles consist essentially of silver and/or silver oxide supported in and/or on the support particles of cerium oxide.

6. The component of claim 2, wherein the particles of silver and/or silver oxide have an average particle size of less than about 100 nm.

7. The component of claim 1, wherein the support particles have an average particle size of less than about 500 nm.

8. The component of claim 1, wherein the cerium oxide is at least partially a non-stoichiometric oxide.

9. The component of claim 1, wherein the catalyst comprises from about 1 to 70% by weight silver and/or silver oxide supported in and/or on particles of cerium oxide.

10. The component of claim 1, wherein the catalyst is capable of acting as both an oxidant for the conversion of carbon monoxide to carbon dioxide and as a catalyst for the conversion of carbon monoxide to carbon dioxide.

11. A cigarette comprising the component of claim 1.

12. The cigarette of claim 11, wherein the catalyst consists essentially of silver and/or silver oxide and the cerium oxide.

13. The cigarette of claim 11, wherein the particles comprising silver have an average particle size of less than about 100 nm or less than about 50 nm.

14. The cigarette of claim 11, wherein the particles comprising silver comprise agglomerates of nanoscale particles, wherein the agglomerates have an average size of from about 1 to 50 microns.

15. The cigarette of claim 14, wherein the agglomerates consist essentially of silver and/or silver oxide.

16. The cigarette of claim 12, wherein the particles of silver and/or silver oxide have an average particle size of less than about 100 nm or less than about 50 nm.

17. The cigarette of claim 11, wherein the support particles have an average particle size of less than about 500 nm.

18. The cigarette of claim 11, wherein the cerium oxide is at least partially a non-stoichiometric oxide.

19. The cigarette of claim 11, wherein the catalyst comprises from about 1 to 70% by weight or from about 5 to 20% by weight silver and/or silver oxide.

20. The cigarette of claim 11, wherein the catalyst is capable of acting as both an oxidant for the conversion of carbon monoxide to carbon dioxide and as a catalyst for the conversion of carbon monoxide to carbon dioxide.

21. A method of making a cigarette comprising the component of claim 1, the method comprising the steps of:
   a. incorporating the catalyst in at least one of tobacco cut filler, cigarette paper and cigarette filter material;
   b. providing the tobacco cut filler to a cigarette making machine to form a tobacco column;
   c. placing the cigarette paper around the tobacco column to form a tobacco rod of a cigarette; and
   d. optionally attaching a cigarette filter comprising the cigarette filter material to the tobacco rod using tipping paper.

22. The method of claim 21, wherein the incorporating comprises spraying, dusting or immersion.

23. The method of claim 21, wherein the catalyst consists essentially of particles of silver and/or silver oxide and the cerium oxide.

24. The method of claim 21, further comprising forming the catalyst via the precipitation or thermal decomposition of a silver salt.

25. The method of claim 24, wherein the salt is silver nitrate.

26. The method of claim 24, wherein the precipitation or thermal decomposition of the silver salt forms nanoscale particles of silver and/or silver oxide.

27. The method of claim 24, wherein the catalyst consists essentially of particles of silver and/or silver oxide and the cerium oxide.

28. The method of claim 21, wherein the particles of silver and/or silver oxide have an average particle size of less than about 100 nm or less than about 50 nm.

29. The method of claim 24, further comprising;
   a. combining the salt with a solvent to form a silver precursor solution;
   b. combining the silver precursor solution with a colloidal solution of an oxide of cerium to form a mixture, wherein the second metal is different than silver;
   c. heating the mixture to a temperature sufficient to thermally decompose the silver salt to form nanoscale particles of silver and/or silver oxide, wherein the nanoscale particles are incorporated in and/or on the cerium oxide; and
   d. drying the mixture to form the catalyst.

30. The method of claim 29, wherein the cerium oxide is at least partially a non-stoichiometric oxide.

31. The method of claim 29, wherein the catalyst comprises from about 1 to 70% by weight or from about 5 to 20% by weight silver and/or silver oxide.

32. The method of claim 29, further comprising heating the catalyst at a temperature of at least 200° C. prior to incorporating the catalyst in and/or on the at least one of tobacco cut filler, cigarette paper and cigarette filter material.

33. The method of claim 32, wherein the catalyst is heated in an atmosphere that oxidizes the silver to form a catalyst consisting essentially of silver oxide supported in and/or on the cerium oxide.

34. The method of claim 21, further comprising forming the catalyst via laser vaporization and controlled condensation of a target material.

35. The method of claim 34, wherein the target material comprises silver and cerium.

36. The method of claim 34, wherein the cerium oxide is at least partially a non-stoichiometric oxide.

37. The method of claim 34, wherein the catalyst comprises from about 1 to 70% by weight or from about 5 to 20% by weight silver and/or silver oxide.

38. The method of claim 34, wherein the catalyst consists essentially of nanoscale particles of silver and/or silver oxide supported in and/or on an oxide of cerium.

39. The method of claim 38, wherein at least some of the silver is incorporated on a surface of the cerium oxide.

40. The method of claim 34, wherein the nanoscale particles of silver and/or silver oxide and the nanoscale particles of cerium oxide condense in the gas phase to form the catalyst.

41. The method of claim 34, wherein the catalyst consists essentially of nanoscale particles of silver and/or silver oxide supported in and/or on nanoscale or micron-sized particles of cerium oxide.

42. The method of claim 34, further comprising heating the catalyst at a temperature of at least 200° C. in an atmosphere that oxidizes the silver prior to incorporating the catalyst in and/or on the at least one of tobacco cut filler, cigarette paper and cigarette filter material.

43. The cigarette of claim 11, wherein the catalyst is present in an amount effective to convert at least 5% of the carbon monoxide in mainstream smoke drawn through the cigarette to carbon dioxide at a temperature of less than about 210° C.

44. The cigarette of claim 11, wherein the catalyst is present in an amount effective to reduce the concentration of CO and/or reduce the concentration of total particulate matter drawn through the cigarette during smoking.

45. The component of claim 1, wherein the particles comprising silver and/or silver oxide have an average particle size of less than about 50 nm.

46. The component of claim 2, wherein the particles of silver and/or silver oxide have an average particle size of less than about 50 nm.

47. The component of claim 1, wherein the catalyst comprises from about 5 to 20% by weight silver and/or silver oxide.

48. The component of claim 1, wherein the catalyst is a calcined catalyst.

* * * * *